United States Patent [19]

Olander

[11] Patent Number: 4,668,583

[45] Date of Patent: May 26, 1987

[54] REFRACTORY COATING

[75] Inventor: Donald E. Olander, Huntington Beach, Calif.

[73] Assignee: Hi-Shear Corporation, Torrance, Calif.

[21] Appl. No.: 670,635

[22] Filed: Nov. 13, 1984

Related U.S. Application Data

[63] Continuation-in-part of Ser. No. 600,129, Apr. 13, 1984, abandoned.

[51] Int. Cl.⁴ .................... C09J 5/00; B32B 9/00; B05D 7/20
[52] U.S. Cl. .................... 428/408; 428/698; 428/699; 423/440
[58] Field of Search .............. 428/698, 699, 408; 501/87, 90; 423/440; 502/423, 430, 428

[56] References Cited

U.S. PATENT DOCUMENTS

| | | | |
|---|---|---|---|
| 2,681,876 | 6/1954 | De Santis et al. | 428/698 X |
| 2,822,301 | 2/1958 | Alexander et al. | 428/698 X |
| 2,929,741 | 3/1960 | Steinberg | 428/698 X |
| 2,972,556 | 2/1961 | Urahiotes et al. | 428/698 X |
| 3,073,717 | 1/1963 | Pyle et al. | 428/698 X |
| 3,165,864 | 1/1965 | Shulze | 52/612 |
| 3,189,477 | 6/1965 | Shaffer | 428/312.2 |
| 3,224,193 | 12/1965 | Loprete et al. | 239/265.11 |
| 3,269,802 | 8/1966 | Wainer et al. | 423/440 X |
| 3,321,922 | 5/1967 | Latto | 60/260 |
| 3,369,920 | 2/1968 | Bourdeau | 427/249 |
| 3,459,504 | 8/1969 | Bracken et al. | 423/440 X |
| 3,479,158 | 11/1969 | Cook | 428/656 |
| 3,607,541 | 9/1971 | Gombel | 428/203 |
| 3,637,422 | 1/1972 | Landingham | 427/229 |
| 3,686,868 | 8/1972 | Chase | 60/200.1 |
| 3,738,906 | 6/1973 | Olcott | 428/212 |
| 3,853,586 | 12/1974 | Olcott | 428/37 |
| 3,870,595 | 3/1975 | Hawthorne | 428/218 |
| 3,900,675 | 8/1975 | Olcott | 428/408 X |
| 3,924,034 | 12/1975 | Olcott | 427/228 |
| 3,959,557 | 5/1976 | Berry | 428/368 |
| 3,980,105 | 9/1976 | Myskowski | 138/140 |
| 4,029,844 | 6/1977 | Olcott | 428/408 X |
| 4,066,821 | 1/1978 | Cook | 428/698 |
| 4,067,742 | 1/1978 | Fletcher | 501/87 |
| 4,123,594 | 10/1978 | Chang | 428/651 |
| 4,123,595 | 10/1978 | Chang | 428/667 |
| 4,247,249 | 1/1981 | Siemers | 415/174 |
| 4,288,495 | 9/1981 | Terner | 428/446 |
| 4,397,901 | 8/1983 | Warren | 428/101 |
| 4,405,685 | 9/1983 | Honjo | 428/368 |
| 4,476,178 | 10/1984 | Veltri | 428/215 |

FOREIGN PATENT DOCUMENTS 397372  8/1933  United Kingdom ............... 423/440

Primary Examiner—Nancy Swisher
Attorney, Agent, or Firm—Donald D. Mon

[57] ABSTRACT

A carbide coating for a surface intended to be subjected to stringencies of temperature and erosion, such as rocket nozzles, turbine blades, heat shields, and hypersonic structures, formed on a carbon substrate from a halide of hafnium, silicon, tantalum or zirconium, followed by deposition from a said halide and a hydrocarbon. The layer has a high melting point, can be made very thin, and resists cracking and spalling.

17 Claims, 2 Drawing Figures

REFRACTORY COATING

CROSS-REFERENCE TO CO-PENDING APPLICATION

This is a continuation-in-part of applicant's presently co-pending U.S. patent application, Ser. No. 600,129, filed Apr. 13, 1984, now abandoned, entitled "Refractory Coating for Rocket Nozzles".

FIELD OF INVENTION

This invention relates to a refactory coating for surfaces which are intended to be exposed to stringencies of temperature and surface abrasion such as rocket nozzles, turbine blades, heat shields, and hypersonic structures, which coating protects its substrate from degradation such as by melting, erosion, cracking, and volatilization.

BACKGROUND OF THE INVENTION

Rocket nozzles are an elegant example of surfaces which are subjected to very hot, high velocity, erosive gases, and sometimes also to abrasive solid particles. Attempts have been made to apply a refractory coating to these nozzles, but these have generally depended on strictly physical forces to make the coating adhere to the substrate. Under these circumstances, cracking and spalling of the coating can and do occur. Similarly, other surfaces are exposed to similar stringencies. Examples are such as turbine blades, heat shields and hypersonic structures. This invention relates to coatings suitable for these general types of surfaces, and to processes for making them.

Further to confound the matter, these coatings have to be applied quite thickly to assure that the necessary physical retention forces are provided—often over 0.050 inches thick. But as a consequence, thermal stresses can be set up during the very rapid heating that occurs in the first few seconds after application of these stringencies, as well as erosive and thermal stringencies which persist during continuing operation. These stringencies often exceed the coating's capacity to withstand, and cracking and spalling can occur. It is even possible, with prior art coatings, for them to develop micro-cracks during processing, which later become regions of weakness.

When the coating cracks or spalls, the hot, high velocity gases are able to get underneath the remaining coating material and remove it, thereby exposing the areas they are intended to protect. In blade and structural applications the velocity of the body itself relative to the gases adds to the problem. This is, of course, intolerable, so the art has developed away from refractory coatings, and has utilized instead such expedients as metal structures whose surfaces can withstand these conditions. An example is the use of wrought tungsten inserts, which are excessively heavy, and are costly.

Because the bond between the prior art coating and the substrate is quite weak, the coating adds little to the strength of the structure, especially at the nozzle insert in rocket nozzle applications. For this reason, expensive high density pyrolytic graphite is often used, even in less stringent applications.

It is the object of this invention to provide a refractory coating which can be applied in thin sections so as to minimize internal thermal stresses, and yet still be so adherent to the substrate that is unlikely to crack or spall. It is very hard, and has a high melting point so that erosion of the coating is substantially eliminated and is strongly bonded to the substrate so that its strength is useful to the structure, and less expensive substrates can be utilized.

BRIEF DESCRIPTION OF THE INVENTION

The coating of this invention is generated in situ on, and is continuously integral with, a carbon substrate. The carbon may be pyrolytic graphite, or "carbon-carbon". It is heated in a vacuum furnace, and a halide of a carbide-forming metal is introduced into the furnace. The metal forms a carbide (or double carbide) portion with the carbon at the surface of the substrate. As the next step in a continuous process, a hydrocarbon gas is introduced along with the halide, and a carbide or double carbide portion is formed as a continuous layer atop the first portion. The two portions together form an integral and continuous carbide layer.

This carbide layer is resistant to cracking and spalling, even when quite thin on the order of 0.0015 to 0.002 inches thick, and yet this thickness is adequate to protect the nozzle for a substantial period of time.

The preferred metal to form the carbide is hafnium, but silicon, tantalum, and zirconium and double carbides of them with hafnium are also useful.

The above and other features of the invention will be fully understood from the following detailed description and the accompanying drawings in which:

DETAILED DESCRIPTION OF THE INVENTION

Figure 1:
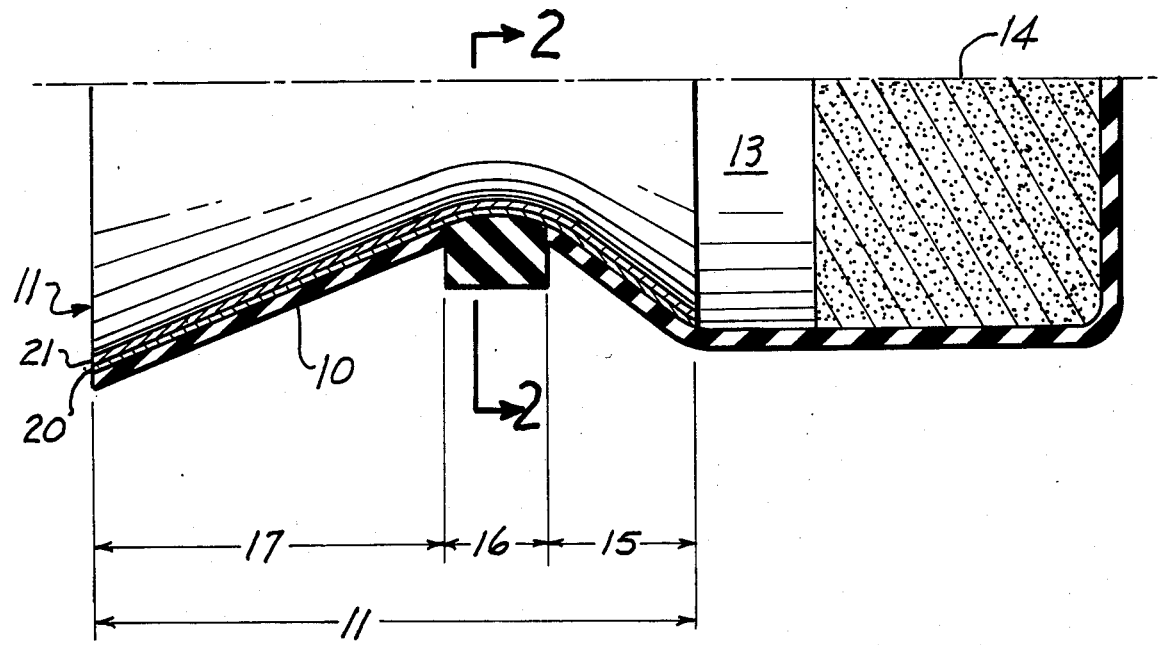
FIG. 1 is a fragmentary cross-section showing a nozzle coated according to the invention.
Figure 2:
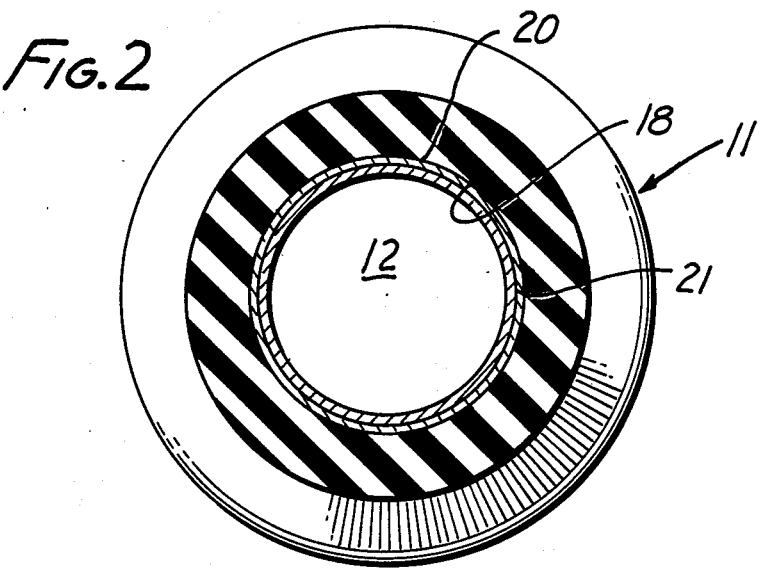
FIG. 2 is a cross-section taken at line 2—2 in FIG. 1.

A substrate 10, made of carbon, forms the underlying structure of a nozzle 11. A rocket nozzle is shown as the best mode known at this time for utilizing the invention. There is an opening 12 for exhaust of propellant gases from the chamber 13 of a rocket motor. A propellant 14 in the chamber is ignited to generate the propellant gases. Classically, a rocket nozzle includes three basic parts: an entrance section 15, a nozzle insert 16, and an exit cone 17. These form a circular surface of revolution 18, which is the inner surface of the nozzle. The said inner surface is formed by these parts, which are suitably joined together.

The term "carbon" is used to denote pyrolytic graphite, and the material of construction familiarly known as "carbon-carbon", which is a construction made of carbonized material, usually a carbonized cloth, that forms a rigid body.

Surface 18 is shown continuously and integrally formed with a carbide layer on it. That portion 20 of the carbide layer which is intimately upon the carbon is in fact a carbide that has been partially formed from the carbon itself, i.e., its carbon was derived from the substrate. The portion 21 upon it is continuous and integral with portion 20, but is formed from a source yet to be described.

The process of manufacturing the layer is as follows. The carbon structure is placed in a vacuum furnace with its outer surface masked off, and surface 18 exposed. The furnace is substantially evacuated, oxygen being substantially removed, and the substrate is heated to approximately 1,300° C. The vacuum need not be especially high. Reactant gases will next be introduced.

A suitable metal halide is next introduced into the chamber. The metalic (or semi-metallic) element of the halide is selected from the group consisting of hafnium, silicon, tantalum and zirconium, and combinations of hafnium and silicon or tantalum or zirconium (which for convenience in disclosure are called "metals"). The combinations form "double carbides". The combination of hafnium and tantalum is preferred for these (about one part hafnium and four parts tantalum). The "single carbide" msot preferred is hafnium carbide.

Suitable halides are the chloride, bromide, and iodide. The iodine is preferred.

The preferred embodiment of the invention is the formation of hafnium carbide utilizing hafnium iodide. The other combinations react and deposit analogously.

The hafnium iodine (or other metal halide) is introduced into the furnace, and forms portion 20, by reacting with the carbon at the surface to form a carbide. The problem which arises is that once the carbon surface is coated with the carbide, no more carbide can be formed with the metal halide, because there is no available carbon to react with it. This problem is overcome by supplying carbon by means of a hydrocarbon admitted to the furnace in the gas or vapor phase, such as methane or ethane, which will react with deposited hafnium (or with depositing hafnium) to form portion 21. Thus, continuous carbide layer portion 21 will be built up atop portion 20.

The interface of the layer with the substrate is the substrate carbon ultimately receiving the carbide. Portion 21 is deposited carbide formed as a product of the admitted reactants on the first portion, or deposited as such on the first portion.

The objective of this invention is to deposit a fine-grained, non-porous layer. A controlling function is the rate of deposition. If the rate is too high, the risk of dendritic growth arises. For this reason, the pressure in the vacuum chamber, and the concentration of the gases are kept quite low, and the flow rate of the gases reasonably high. These are parameters which must be determined experimentally, but the formation of a suitable rather than unsuitable layer, is readily observable. After a layer of suitable thickness is formed, the nozzle will be cooled and removed from the chamber.

Any suitable carbon-containing substance may be used for the preparation of the second portion, but it is better that it be a hydrocarbon so as not to foul the layer. Volatilizable members of the alkane, alkene, and alkyne series are useful. The lower alkanes (five or less carbons) such as methane and ethane are preferred for their convenience in handling.

The single carbides of silicon, tantalum, and zirconium will be prepared from their halides, analogously to the above. The double carbides hafnium/silicon, hafnium/tantalum, and hafnium/zirconium will be prepared from a mixture of their halides. These are always accompanied in the later stages by the introduction of a hydrocarbon.

It will be noted that portion 20 constitutes an in situ-formed carbide layer portion made continuous with and integral with the carbon substrate. It is partially formed from the material of the substrate. A continuous and integral carbide layer, formed from the metal halide or metal halides and the hydrocarbon is formed upon it. Even a thin layer with this construction has great strength and integrity, and because of its thinness is less liable to cracking and spalling than conventional refractory layers.

It is important that the deposition be a continuous process. For reasons that are not understood, if the deposition stops and then is resumed, the subsequent material behaves as though it were merely applied, and a less reliable coating is made.

The strongly adherent coating enables one to utilize less expensive materials for the nozzle insert than pyrolitic graphite, which is an important advantage.

The entire nozzle assembly need not be coated with this material, although conveniently it will be. The nozzle insert will benefit the most form this invention.

It will be appreciated that the thickness of the layer portions in the drawings is exaggerated for purposes of illustration.

These carbides, especially hafnium carbide and hafnium/tantalum carbide, have very high melting points and can thereby resist the high temperatures of propellant gases. They are readily formed with simple processing equipment, and provide a nozzle lining which represents a substantial improvement over the prior art.

While a surface for a rocket nozzle is shown as the best known mode, it is to be understood that this is merely exemplary. This invention is useful wherever the recited carbides are resistive to the chemical stringencies of the specific application, and whether the stringencies of abrasion, for example are generated by gases moving relative to a fixed surface, or a surface moving relative to the gases (a hypersonic structure or heat shield), or a surface moving relative to a moving gas (a turbine blade).

This invention is not to be limited to the embodiments shown in the drawings and described in the description, which are given by way of example and not of limitation, but only in accordance with the scope of the appended claims.

I claim:

1. A surfacing for resistance to stringencies of erosion and elevated temperature which are characteristically encountered in rocket nozzles, on turbine blades, on heat shields, and on hypersonic structures, to protect an underlying carbon substrate which has before the formation of this surfacing an exposed carbon surface which is shaped and intended to be exposed to said stringencies but for the interposition of said surfacing, the depth of said substrate beneath said exposed surface being sufficient that there is a substantial thickness of carbon beneath the surfacing; said surfacing being formed as a continuum with the substrate at said surface, said surfacing having been formed by means of the following processing steps conducted in the order recited:

a. placing the substrate in a closed vacuum furnace, reducing the pressure therein and heating the substrate to a temperature sufficient to enable the reactions defined hereinafter;

b. admitting into the furnace a metal halide which vaporizes, whereby to form an initial carbide at said surface, formed as an intermolecular diffusion-grown carbide as a transition from the carbon substrate, derived only from metal from the metal halide, and from carbon derived only from said substrate;

c. as a next event after step b, admitting to said furnace along with said metal halide, a carbon-containing compound, whereby to form by vapor deposition on said initial carbide, additional carbide formed of carbon from said carbon-containing compound and of metal from said metal halide as a continuous and uninterrupted carbide structure, so as to complete said surfacing as a structurally integral body without demarcation or discontinuity in itself; said surfacing being at least on the order of about 0.0015 inches thick, or thicker; and
  d. cooling said surfaced substrate and removing it from said furnace;
  said metal of said metal halide being selected from the group consisting of hafnium, silicon, tantalum, zirconium, and combinations of hafnium and silicon, tantalum or zirconium.

2. A surfacing according to claim 1 in which the halogen of said halide is selected from the group consisting of bromine, chlorine, and iodine.

3. A surfacing according to claim 2 in which the metal of the halide is hafnium.

4. A surfacing according to claim 1 in which the carbon-containing compound is a hydrocarbon.

5. A surfacing according to claim 4 in which the metal of the halide is hafnium.

6. A surfacing according to claim 4 in which the hydrocarbon is selected from the group consisting of lower alkanes, lower alkenes, and lower alkynes.

7. A surfacing according to claim 1 in which the carbon substrate is pyrolytic graphite or "carbon-carbon".

8. A surfacing according to claim 1 in which the surfaced substrate is a rocket nozzle.

9. A surfaced carbon substrate comprising a substrate and a surfacing formed as defined hereinafter, said surfacing providing resistance to stringencies of erosion and elevated temperatures which are characteristically encountered in rocket nozzles, on turbine blades, on heat shields, and on hypersonic structures, said substrate having had, before the formation of the surfacing an exposed carbon surface, which is shaped and intended to be directly exposed to said stringencies but for the interposition of said surfacing, the depth of said substrate beneath said exposed surface being sufficient that there is a substantial thickness of carbon beneath the surfacing; said surfacing being formed as a continuum with the substrate at said surface, said surfacing having been formed by means of the following processing steps conducted in the order recited:
  a. placing the substrate in a closed vacuum furnace, reducing the pressure therein, and heating the substrate to a temperature sufficient to enable the reactions defined hereinafter;
  b. admitting into the furnace a metal halide which vaporizes, whereby to form an initial carbide at said surface, formed as an intermolecular diffusion-grown carbide as a transition from the carbon substrate, derived only from metal from the metal halide, and from carbon only from said substrate;
  c. as a next event after step b, admitting to said furnace along with said metal halide, a carbon-containing compound, whereby to form by vapor deposition on said initial carbide, additional carbide formed of carbon from said carbon-containing compound and of metal from said metal halide as a continuous and uninterrupted carbide structure, so as to complete said surfacing as a structurally integral body without demarcation or discontinuity in itself, said surfacing being at least on the order of about 0.0015 inches thick, or thicker; and
  d. cooling said surfaced substrate and removing it from said furnace;
  said metal of said metal halide being selected from the group consisting of hafnium, silicon, tantalum, zirconium, and combinations of hafnium and silicon, tantalum, or zirconium.

10. A surfaced carbon substrate according to claim 9 in which the halogen of said halide is selected from the group consisting of bromine, chlorine, and iodine.

11. A surfaced carbon substrate according to claim 9 in which the metal of the halide is hafnium.

12. A surfaced carbon substrate according to claim 9 in which the carbon-containing compound is a hydrocarbon.

13. A surfaced carbon substrate according in claim 12 in which the metal of the halide is hafnium.

14. A surfaced carbon substrate according to claim 12 in which the hydrocarbon is selected from the group consisting of lower alkanes, lower alkenes, and lower alkynes.

15. A surfaced carbon substrate according to claim 9 in which the carbon substrate is pyrolytic graphite or "carbon-carbon".

16. A surfaced carbon substrate according to claim 9 which is a rocket nozzle.

17. A process for producing a surfacing for resistance to stringencies of erosion and elevated temperature which are characteristically encountered in rocket nozzles, on turbine blades, on heat shields, and on hypersonic structures, to protect an underlying carbon substrate which has before the formation of this surfacing an exposed carbon surface which is shaped and intended to be exposed to said stringencies but for the interposition of said surfacing, the depth of said substrate beneath said exposed surface being sufficient that there is a substantial thickness of carbon beneath the surfacing, said surfacing being formed as a continuum with the substrate at said surface, said surfacing having been formed by means of the following processing steps conducted in the order recited:
  a. placing the substrate in a closed vacuum furnace, reducing the pressure therein and heating the substrate to a temperature sufficient to enable the reactions defined hereinafter;
  b. admitting into the furnace a metal halide which vaporizes, whereby to form an initial carbide at said surface, formed as an intermolecular diffusion-grown carbide as a transition from the carbon substrate, derived only from metal from the metal halide, and from carbon derived only from said substrate;
  c. as a next event after step b, admitting to said furnace along with said metal halide, a carbon-containing compound, whereby to form by vapor deposition on said initial carbide, additional carbide formed of carbon from said carbon-containing compound and of metal from said metal halide as a continuous and uninterrupted carbide struture, so as to complete said surfacing as a structurally integral body without demarcation or discontinuity in itself said surfacing being at least on the order of about 0.0015 inches thick, or thicker; and
  d. cooling said surfaced substrate and removing it from said furnace;
  said metal of said metal halide being selected from the group consisting of hafnium, silicon, tantalum, zirconium, and combinations of hafnium and silicon, tantalum or zirconium.

* * * * *